US012049031B2

(12) United States Patent
Lambert et al.

(10) Patent No.: US 12,049,031 B2
(45) Date of Patent: Jul. 30, 2024

(54) METHOD FOR PRODUCING A COMPOSITE COMPONENT

(71) Applicant: BASF SE, Ludwigshafen (DE)

(72) Inventors: Jürgen Lambert, Gommersheim (DE); Christian Obermann, Speyer (DE); Jürgen Bartl, Ludwigshafen (DE); Andreas Medert, Lampertheim (DE)

(73) Assignee: BASF SE, Ludwigshafen am Rhein (DE)

( * ) Notice: Subject to any disclaimer, the term of this patent is extended or adjusted under 35 U.S.C. 154(b) by 516 days.

(21) Appl. No.: 15/119,947

(22) PCT Filed: Feb. 13, 2015

(86) PCT No.: PCT/EP2015/053103
§ 371 (c)(1),
(2) Date: Aug. 18, 2016

(87) PCT Pub. No.: WO2015/124505
PCT Pub. Date: Aug. 27, 2015

(65) Prior Publication Data
US 2017/0066167 A1    Mar. 9, 2017

(30) Foreign Application Priority Data
Feb. 20, 2014   (EP) .................................. 14155924

(51) Int. Cl.
*B29C 45/14* (2006.01)
*B29C 45/78* (2006.01)
B29K 675/00 (2006.01)

(52) U.S. Cl.
CPC .. *B29C 45/14795* (2013.01); *B29C 45/14311* (2013.01); *B29C 45/14836* (2013.01);
(Continued)

(58) Field of Classification Search
CPC ............................................. B29C 45/14795
See application file for complete search history.

(56) References Cited

U.S. PATENT DOCUMENTS 3,883,629 A * 5/1975 Garner .................. B29C 44/086
264/55
5,184,866 A * 2/1993 Dresen ..................... B60J 3/002
296/180.1
(Continued)

FOREIGN PATENT DOCUMENTS

DE        10036185 A1    1/2001
DE    102004051249 A1    4/2006
(Continued)

OTHER PUBLICATIONS

International Search Report for PCT/EP2015/053103 mailed Mar. 13, 2015.
(Continued)

*Primary Examiner* — Austin Murata
(74) *Attorney, Agent, or Firm* — Faegre Drinker Biddle & Reath LLP

(57) ABSTRACT

The invention relates to a process for the production of a composite component (33) which comprises a molding (1) made of a thermoplastic polymer foam and which comprises a functional layer (37) made of an unfoamed thermoplastic, comprising the following steps:
(e) insertion of the molding (1) made of thermoplastic polymer foam into a mold (3),
(f) application of a thermoplastic polymer by an injection process, where the pressure during the application of the thermoplastic polymer is smaller than 100 bar.

13 Claims, 3 Drawing Sheets

(52) U.S. Cl.
CPC .... *B29C 45/78* (2013.01); *B29C 2045/14319* (2013.01); *B29C 2045/14327* (2013.01); *B29C 2045/14885* (2013.01); *B29C 2945/76531* (2013.01); *B29C 2945/76732* (2013.01); *B29K 2675/00* (2013.01)

(56) References Cited

U.S. PATENT DOCUMENTS

| | | |
|---|---|---|
| 5,681,519 A | 10/1997 | Kelman |
| 5,989,473 A | 11/1999 | Haverty |
| 7,045,206 B1 | 5/2006 | Granata et al. |
| 2002/0176980 A1 | 11/2002 | Marcovecchio |
| 2004/0247725 A1* | 12/2004 | Lang .................... B23P 15/246 425/183 |
| 2005/0079336 A1* | 4/2005 | Dry .................... B29C 44/1285 428/304.4 |
| 2006/0147697 A1* | 7/2006 | Medina-Galarza ... B29C 45/372 428/314.4 |
| 2006/0235095 A1* | 10/2006 | Leberfinger ............... C08J 9/32 521/56 |
| 2008/0023979 A1* | 1/2008 | Trillat .................... B60K 37/00 296/70 |
| 2009/0075084 A1* | 3/2009 | Kochi ........................ C08J 9/34 428/409 |
| 2009/0148663 A1* | 6/2009 | Beau .................. B29C 44/0461 428/141 |
| 2009/0215914 A1* | 8/2009 | Hirose ....................... C08J 9/18 521/65 |
| 2011/0293914 A1* | 12/2011 | Maurer ................. B29C 44/569 428/304.4 |
| 2011/0300361 A1* | 12/2011 | Nakayama ................. C09J 7/26 428/220 |
| 2013/0069274 A1* | 3/2013 | Zhang ................. B29C 45/1671 264/279 |
| 2013/0296449 A1* | 11/2013 | Peterson ................ C08J 9/0009 521/122 |
| 2015/0352816 A1* | 12/2015 | Wang ................ B29C 45/14795 428/319.3 |

FOREIGN PATENT DOCUMENTS

| | | | |
|---|---|---|---|
| EP | 0268954 A2 | | 6/1988 |
| EP | 1022105 A1 | | 7/2000 |
| EP | 1095752 A1 | | 5/2001 |
| EP | 2540471 A2 | | 1/2013 |
| GB | 2448611 | * | 10/2008 |
| WO | WO-2006042818 A1 | | 4/2006 |

OTHER PUBLICATIONS

Li, Jiye et al., Practical Manual of Modern Engineering Materials, Aug. 2017, pp. 607-611. In Chinese. No English Translation or English Abstract available.

Li, Jiye et al., Practical Manual of Modern Engineering Materials, Aug. 2017, pp. 607-611. English Description.

* cited by examiner

METHOD FOR PRODUCING A COMPOSITE COMPONENT

CROSS-REFERENCE TO RELATED APPLICATIONS

This application is a national stage application (under 35 U.S.C. § 371) of PCT/EP2015/053103, filed Feb. 13, 2015, which claims benefit of European Application No. 14155924.5, filed Feb. 20, 2014, both of which are incorporated herein by reference in their entirety.

The invention relates to a process for the production of a composite component which comprises a molding made of a thermoplastic polymer foam and which comprises a functional layer made of an unfoamed thermoplastic.

Composite components with a molding made of a thermoplastic polymer foam and a functional layer made of an unfoamed thermoplastic are used by way of example as lid-sealing systems, transport containers with resilient grip regions, containers with resilient inserts, toys with resilient regions, etc.

It is current practice in particular to process expandable or expanded thermoplastic polyurethane on commercially available molding machines designed for producing particle foams. In these machines, beads made of the expandable thermoplastic polyurethane are introduced into a mold, through which steam is then passed. The steam softens the thermoplastic polyurethane, which can therefore be foamed by the blowing agent comprised therein. The beads therefore fill the mold completely, and a super atmospheric pressure is generated in the interior of the mold. By virtue of said super atmospheric pressure, the expanded thermoplastic polyurethane beads softened by the high temperature of the steam are fused to one another to give the desired molding. If the intention is that the resultant molding made of a particle foam be bonded to another polymer, conventional jointing techniques have to be used: by way of example, a bond can be achieved via adhesive bonding or via welding. Alternatively it is also possible to introduce, into the molding made of the particle foam, metal inserts within which a further component can be attached by a screw-thread connection.

DE-A 100 36 185 describes a possible process for the production of a composite of a particle foam made of a thermoplastic and of at least one layer bonded to the article foam. To this end, prefoamed beads are heated to a temperature in the region of the melting point and are bonded to one another to give a molding. During this process or subsequently, the beads are bonded to the layer. The layer to which the prefoamed beads are bonded is an optionally fiber-reinforced foil or a sheet-like, unfoamed component which has the shape of the desired surface. The bonding of the layer to the molding made of the particle foam is achieved by lamination, in that the surface of the molding is heated to melting point, in order that the molding made of the particle foam can then be bonded to the layer.

All of the processes known from the prior art have the disadvantage that it is not possible to produce any desired geometry of the composite of molding made of polymer foam and another unfoamed polymer. In particular, it is not possible to realize undercuts or injection into undercut regions. Furthermore, many independent steps are necessary, and these make the production process complicated.

It was therefore an object of the present invention to provide a process which, with lower cost than is known from the prior art, permits production of composite workpieces with a core made of a polymer foam and a functional layer made of an unfoamed thermoplastic, and which moreover also can produce complex geometries.

Said object is achieved via a process for the production of a composite component which comprises a molding made of a thermoplastic polymer foam and which comprises a functional layer made of an unfoamed thermoplastic, comprising the following steps:
 (a) insertion of the molding made of thermoplastic polymer foam into a mold,
 (b) application of a thermoplastic polymer by an injection process, where the pressure during the application of the thermoplastic polymer is smaller than 100 bar.

The application of the thermoplastic polymer for the production of the functional layer via an injection process permits realization of any desired geometries of the functional layer. In particular, it is also possible by this method to produce geometries which comprise undercuts or comprise injection into undercut regions, or comprise similar shapes which are difficult or impossible to produce by the processes known from the prior art.

In the production of a functional layer on a molding made of a thermoplastic polymer foam it is usual to avoid injection processes, since these are carried out at high pressures which, during the production process, compress the polymer foam in a manner that causes loss of the desired properties which are the reason for use of the polymer foam. Surprisingly, it has now been found that when the thermoplastic polymer is applied by an injection process using a pressure of less than 100 bar, the polymer foam that forms the molding is only slightly compressed, and the desired properties of the composite component produced by the process of the invention, in particular the resilience and compressibility of the polymer foam, are therefore retained.

The thickness of the molding made of polymer foam in the finished composite component can be as little as 70% of the original thickness, depending on the pressure used for the injection process for the application of the thermoplastic polymer for the functional layer, and on the compressibility of the polymer foam. It is preferable, however, that the thickness of the molding made of polymer foam in the finished composite component is from 80 to 95% of the original thickness of the molding. In order to achieve this, it is necessary to adjust the pressure in a manner that depends on the compressibility of the molding: greater compressibility requires a lower pressure.

The thermoplastic polymer foam from which the molding has been manufactured can be any open-cell or closed-cell polymer foam that can be produced from a thermoplastic. The thermoplastic polymer foam is particularly preferably a particle foam.

The production of the molding made of the polymer foam can be achieved in any desired manner known to the person skilled in the art: by way of example, webs made of a foamed polymer can be produced, and the moldings can be cut out from the webs. If the polymer foam from which the molding has been produced is a particle foam, the molding can be produced by any process known to the person skilled in the art for the production of moldings made of a particle foam: it is possible by way of example to charge pellets made of an expandable thermoplastic polymer to a mold, to expand the pellets to give foam beads by heating, and then to use pressure to bond the hot foam beads to one another. The pressure is generated here via the foaming of the beads, the volume of which increases while the internal volume of the mold remains the same. Uniform heating can be achieved by way of example by passing steam through the mold. However, it is alternatively also possible to charge pre-expanded beads to the mold. In this case, the procedure begins with complete filling of the mold. In a further step, the volume of the mold is reduced by insertion of a ram at the feed aperture, which has likewise been completely filled with expanded beads, and the pressure in the mold is thus increased. The expanded beads are thus pressed against one another, and can therefore become fused to give the molding. Here again, the fusion of the beads is in particular achieved via passage of steam through the system.

The injection process used to apply the thermoplastic polymer can by way of example be an injection-molding process, a transfer-molding process, or an injection-compression-molding process. The manner in which the injection-molding process, transfer-molding process, or injection-compression-molding process is conducted here is the usual manner in which an injection-molding process, transfer-molding process, or injection-compression-molding process is conducted when a coating is provided around an insert. It is possible on the one hand to insert the molding made of thermoplastic polymer into a mold for the injection-molding process, transfer-molding process, or injection-compression-molding process, and then to apply the thermoplastic polymer. Alternatively, it is also possible to utilize, for the overmolding process, the mold in which the molding made of the polymer foam is also produced. It is usual to use, for this purpose, molds with displaceable core. If the intention is that the thermoplastic polymer be applied only to one side of the molding made of polymer foam, it is alternatively also possible, after the production of the molding made of polymer foam, to remove one mold half, and to seal the second mold half in which the molding is still present by using another mold half into which the thermoplastic polymer for the functional layer is then injected or forced.

In order to avoid compression of the molding made of the polymer foam by more than 30%, in particular by more than from 5 to 15%, the injection-molding process is carried out with a pressure of less than 100 bar, with a holding pressure of less than 50 bar, and with an injection speed of less than 100 mm/s. It is preferable that the injection-molding process is carried out with a pressure in the range from 20 to 60 bar and with a holding pressure in the range from 10 to 30 bar. It is preferable that the injection speed is in the range from 10 to 50 mm/s.

The injection-molding process can be carried out with any desired gating system known to the person skilled in the art. The sprue cross-section on the component here is usually in the range from 0.5 to 10 mm, preferably in the range from 1.0 to 6.0 mm. It is possible to use either hot-runner systems or cold-runner systems for the injection to apply the thermoplastic polymer. In order to control the melt made of the thermoplastic polymer which is applied to the molding made of polymer foam, it is also possible to use cascade systems for the injection or introduction process. This is particularly advantageous when the intention is to apply the thermoplastic polymer to large areas on the molding made of polymer foam. A cascade control system can be used not only in the injection-molding process but also in the transfer-molding process.

The melt temperature of the thermoplastic polymer applied in step (b) is preferably in the range from 180 to 260° C. The temperature here depends on the polymer used for the polymer foam and on the thermoplastic polymer applied to the molding made of polymer foam. The temperature has to be sufficiently high to permit processing, in the injection process, of the thermoplastic polymer that is applied to the molding. The temperature must moreover be sufficiently high to provide incipient melting of the thermoplastic polymer of the molding, in order to obtain a good bond. However, on the other hand the temperature is not permitted to be sufficiently high to provide incipient melting of a relatively thick layer of the molding, since this results in damage to the foam of the molding. It is preferable that the temperature of the thermoplastic polymer that is applied in step (b) to the molding is in the range from 190 to 240° C.

In order to permit uniform inflow of the thermoplastic polymer into the mold for the injection process and moreover to permit sufficiently rapid hardening, in order that the process can be conducted cost-effectively, the temperature of the mold is preferably controlled to a temperature in the range from 10 to 60° C., in particular to a temperature in the range from 20 to 40° C.

Polymer used for the thermoplastic polymer foam can be any desired thermoplastic polymer which can be foamed. The polymer foam is composed of an expanded thermoplastic polyurethane (ETPU) or of a biodegradable, aliphatic-aromatic copolyester, for example obtainable as Ecoflex® from BASF SE.

The thermoplastic polymer that is applied to the molding made of polymer foam can likewise by any desired thermoplastic polymer. It is preferable that the thermoplastic polymer applied in step (b) is selected from polyamide (PA), thermoplastic polyurethane (TPU), acrylonitrile-butadiene-styrene (ABS), styrene-acrylonitrile (SAN), acrylate-styrene-acrylonitrile (ASA), acrylate-styrene-acrylonitrile/polycarbonate blend (ASA/PC), polycarbonate (PC), acrylonitrile-butadiene-styrene/polycarbonate blend (ABS/PC), acrylonitrile-butadiene-styrene/polyamide blend (ABS/PA), styrene-butadiene copolymer (SB), and polymethyl methacrylate (PMMA). The thermoplastic polymer used can have reinforcement. Examples of materials that can be used for the reinforcement are fibers, for example short fibers or long fibers. Examples of suitable fiber material are glass, carbon, aramid, and basalt. It is moreover possible to equip the thermoplastic polymer with a flame-retardant system. Flame-retardant additive used can comprise any flame-retardant system that is known to the person skilled in the art and is suitable for the thermoplastic polymer used.

In order to improve the adhesion of the thermoplastic polymer on the molding made of polymer foam, it is possible to pretreat the molding, for example via corona treatment or plasma treatment.

The molding made of polymer foam can moreover have a geometric shape that achieves improved adhesion: by way of example, it is possible to use a foam with a relatively high proportion of interstices, preferably in the range from 10 to 50%. On application of the thermoplastic polymer, the melt can flow into the cavities formed by the interstices, with resultant improved adhesion.

The process of the invention moreover allows a molding made of polymer foam to be designed with perforations or undercuts. When the melt of the thermoplastic polymer is applied in step (b) it can flow into the perforations or the undercuts, likewise with resultant improved adhesion.

The thickness of the functional layer which is applied by the process of the invention to the molding made of the polymer foam is preferably in the range from 0.2 to 10 mm. It is preferable that the thickness of the functional layer is in the range from 0.5 to 3 mm. Functional layers of low thickness can in particular be used in order to realize a desired surface structure, or else a smooth surface. Greater thicknesses of the functional layer in particular permit use for particular applications or for reinforcement: with a greater thickness it is by way of example possible to mold functional elements onto the functional layer. Examples of functional elements of this type are ribs for the reinforcement of the composite component. On the one hand the molding-on of the functional elements can be achieved before the end of the injection process via use of an appropriate mold, and on the other hand the functional elements can be molded onto the functional layer in a further step, for example by injection or welding.

The functional layer moreover also permits application of structures to the surface of the composite component. The structures can by way of example be produced by erosion, milling, or laser processes. It is moreover possible to color the composite component by, for example, applying a colored functional layer, or by producing the functional layer from a plastic on which a coating material can be used, or by a surface-modification process, with the aim of applying a coating material. This type of surface-modification process can by way of example be realized via corona treatment or plasma treatment.

Embodiments of the invention are depicted in the figures and are explained in more detail in the description below.

Figure 1:
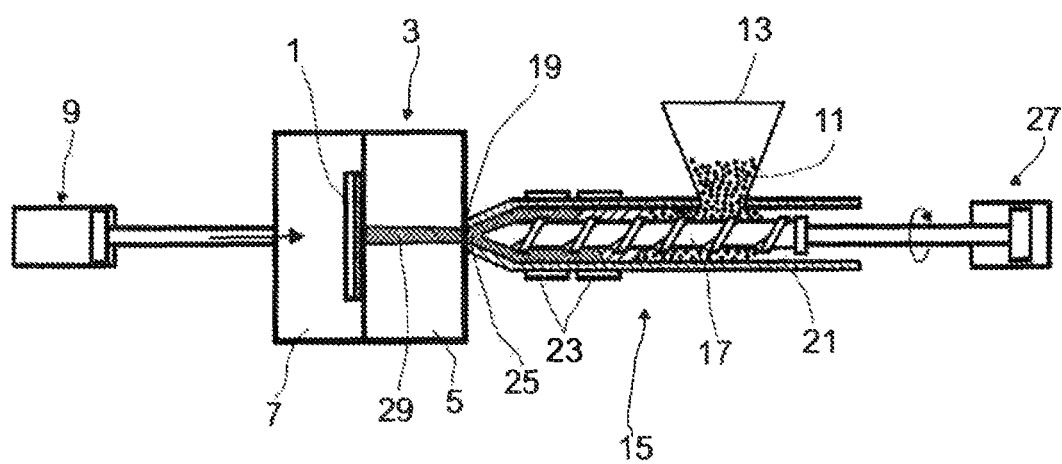
FIG. 1 shows an apparatus for carrying out the process of the invention.

In order to produce a composite component from molding 1 made of a polymer foam 1 with a functional layer made of a thermoplastic polymer, the molding 1 made of polymer foam is inserted into a mold 3 for an injection process.

The insertion of the molding 1 made of polymer foam can by way of example be realized in that the molding 1 is inserted into a first mold half 5 of the mold 3. A second mold half 7 is then used to seal the first mold half 5. The diagram here shows, for the sealing process, a clamping unit 9, which is used to displace the second mold half 7 in the direction of the first mold half 5 until the two mold halves 5, 7 have been closed. Another possibility, alongside the insertion of the molding 1 made of polymer foam into the first mold half 5, is of course insertion of the molding 1 made of polymer foam into the second mold half 7, and displacement of the second mold half 5 together with the molding 1 made of polymer foam in the direction of the first mold half 5, until the mold 3 has been closed.

Once the mold 3 has been sealed, with the molding 1 made of polymer foam positioned therein, a thermoplastic polymer is injected into the mold. In the embodiment depicted here, this is achieved via an injection-molding process. In an injection-molding process, pellets 11 made of a thermoplastic polymer are usually introduced by way of an input unit, for example a feed hopper 13, into a reciprocating-screw machine 15. In the reciprocating-screw machine 15, the pellets are transported via rotation of a screw 17 in the direction of a nozzle 19. The pellets in the reciprocating-screw machine 15 are first compacted and then melted. The melting is to some extent achieved by virtue of a temperature rise during the compaction process. In addition, the housing 21 of the reciprocating-screw machine 15 is usually heated by heating apparatuses, for example heating tapes 23, from the outside, in order to assist the melting of the pellets made of thermoplastic polymer. Prior to the nozzle 19 there is a melt reservoir 25 into which the melt is conveyed. As soon as the melt reservoir 25 has been filled and the mold 3 has been closed, the screw is moved axially in the direction of the nozzle 19 with the aid of an advancer unit 27. The melt is thus forced from the melt reservoir 25 through the nozzle 19 and a runner system 29 into the mold 3, where it flows into the regions not filled by the molding 1 made of polymer foam.

Once the melt has been forced into the mold, the screw 17 is moved back to the starting position, and fresh melt is transported into the melt reservoir 25. At the same time, the melt in the mold 3 cools and solidifies. As soon as the injected polymer has achieved sufficient strength, the mold 3 is opened and the resultant composite component is removed.

In the invention, the injection process is carried out with an injection pressure of at most 100 bar and with a holding pressure of at most 50 bar, in order to prevent damage to the molding 3 made of polymer foam, and to obtain the desired properties of the composite component with the core of the molding 1 made of polymer foam. The injection pressure and the holding pressure here are measured at the advancer unit for the screw. Another result of this is that the melt being discharged from the nozzle 19 into the runner system 29 has a lower pressure. However, the pressure maintained must be sufficiently high that the melt fills all of the cavities in the mold 3. The lower the viscosity of the melt here, the lower the pressure that can be selected.

Figure 2:
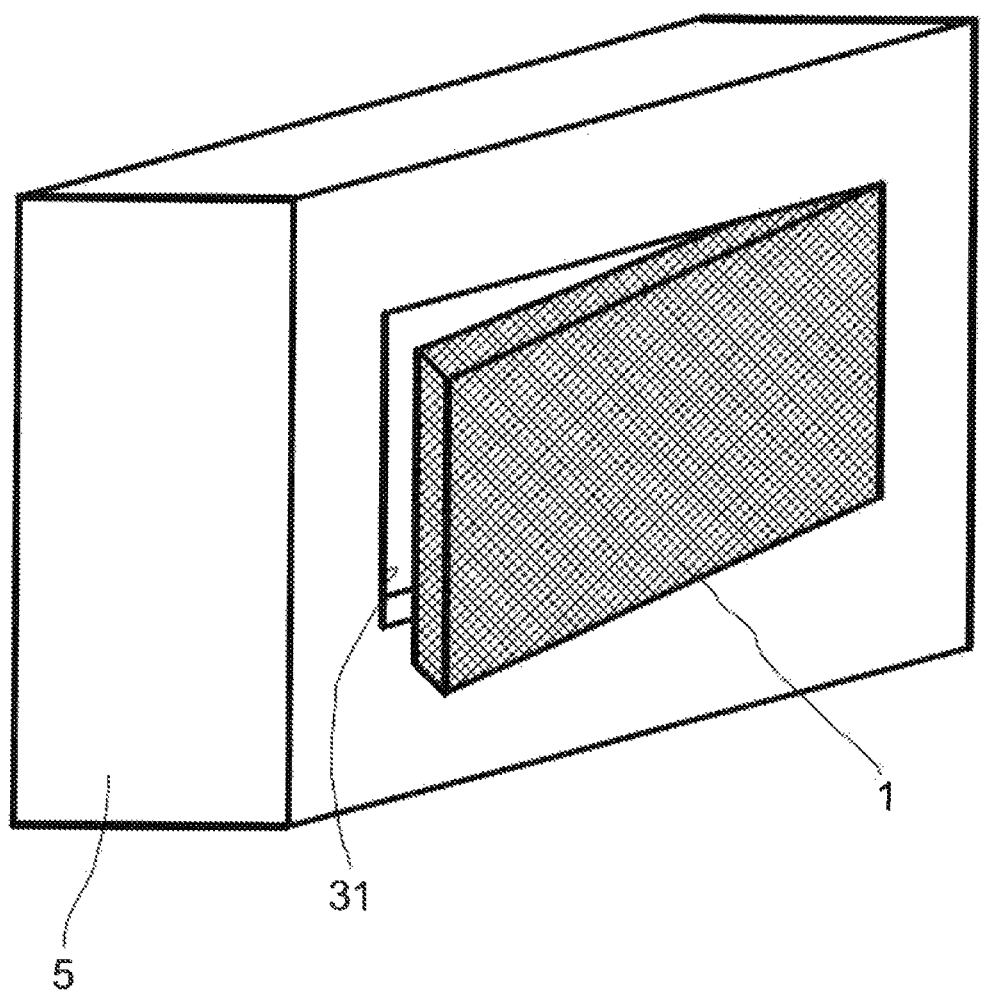
FIG. 2 is a three-dimensional diagram of a mold for carrying out the process.

FIG. 2 shows by way of example the insertion of the molding 1 made of polymer foam into the first mold half 5 of the mold 3. In the first mold half 5 here there is a cavity 31 which can receive the molding 1 made of polymer foam. If the intention is to inject material around all sides of the molding 1 made of polymer foam, it is necessary to provide holder systems which hold the molding 1 made of polymer foam in position. The design of the holder systems here can be the same as the usual design of those used for processes in which a thermoplastic polymer is injected around a solid core or into undercut regions of a solid core.

Figure 3:
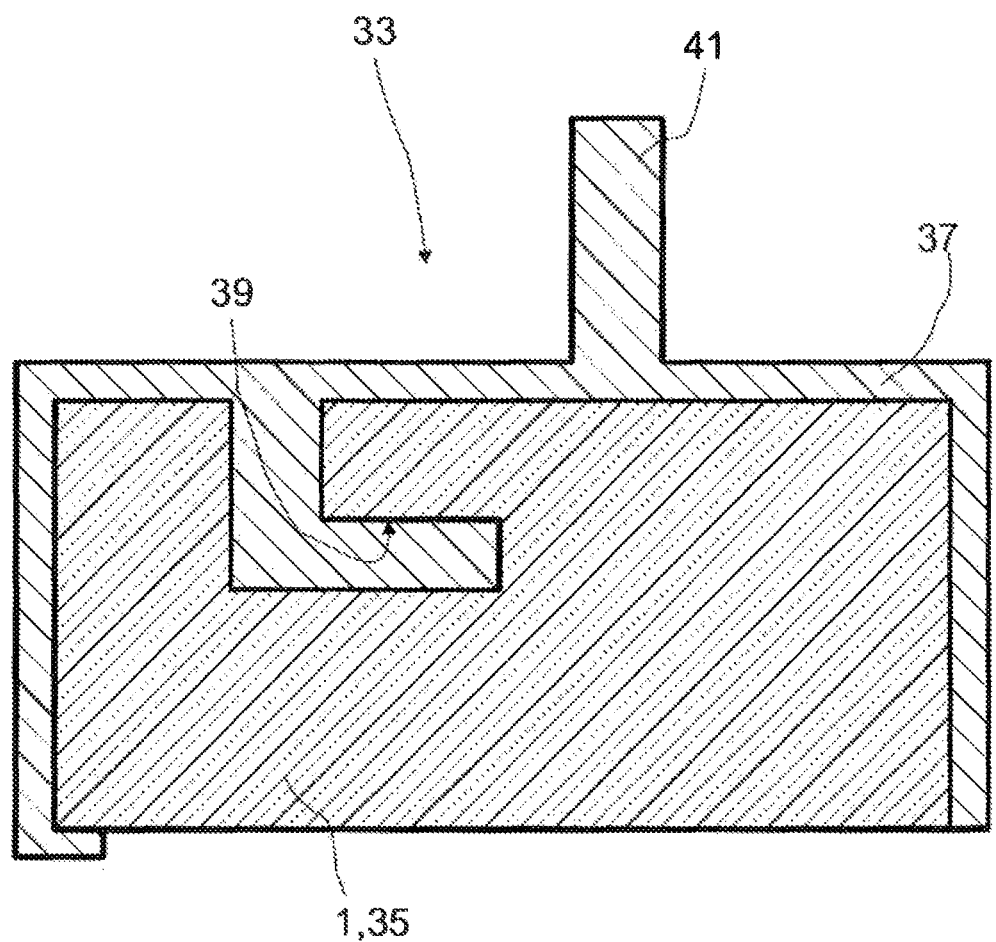
FIG. 3 is a view of a section through a composite component of the invention.

FIG. 3 shows a section through an example of a composite component of the type that can be produced by the process of the invention.

The composite component 33 comprises a core 35, formed from the molding 1 made of polymer foam. A functional layer 37 has been formed around said core 35. The functional layer 37 here can completely enclose the core 35 or can have been applied only in certain regions on the core 35. This is advisable in particular when coating of the core 35 on only one side is desirable in order by way of example to obtain a prescribed surface structure, for example a decorative structure, or a smooth surface. It is also possible by this method to provide only the visible regions of the composite component 33 with a functional layer 37, which then by way of example can also be covered with a coating material.

The process of the invention can also provide a functional layer to a molding 1 made of polymer foam which has undercuts 39. The undercuts 39 have the further advantage of better retention of the functional layer 37 on the molding 1 made of polymer foam, since the undercuts 39 and the thermoplastic polymer that has flowed into the undercuts 39 and that constitutes the functional layer 37 additionally provide a mechanical connection.

Another possibility, alongside coating of the molding 1 made of polymer foam with a functional layer 37 for decorative purposes, is to establish technical properties via the functional layer 37; by way of example, the functional layer 37 can improve the mechanical stability of the composite component 33. It is additionally possible to provide functional elements 41 to the functional layer 37. By way of example, the functional elements 41 can be molded onto the functional layer 37 in a subsequent injection process. It is also alternatively possible that the functional elements 41 are molded simultaneously with the functional layer 37 in the injection process in step (b). Another possibility is moreover that the functional elements 41 are welded onto the functional layer in a subsequent step. Examples of functional elements 41 are ribs for the reinforcement of the composite component 33, elevations into which screw threads can be introduced, or external screw threads attached on the functional layer in order to permit releasable mechanical connection to another component. The functional elements can moreover also be clips, spacers, sealing elements, or any desired other elements for the fulfillment of particular functions.

The nature of the production process for the functional elements 41 determines whether these can have been manufactured from the thermoplastic polymer used for the functional layer 37 or from another polymer which can be bonded to the thermoplastic polymer of the functional layer 37.

KEY

1 Molding
3 Mold
5 First mold half
7 Second mold half
9 Clamping unit
11 Pellets
13 Feed hopper
15 Reciprocating-screw machine
17 Screw
19 Nozzle
21 Housing
23 Heating tape
25 Melt reservoir
27 Advancer unit
29 Runner system
31 Cavity
33 Composite component
35 Core
37 Functional layer
39 Undercut
41 Functional element

The invention claimed is:

1. A process for the production of a composite component, said composite component comprising (a) a molding consisting of a thermoplastic polymer foam and (b) a functional layer made of an unfoamed thermoplastic, the process comprising:
(a) inserting the molding consisting of thermoplastic polymer foam into a mold,
(b) subsequently applying a thermoplastic polymer by an injection process to form the functional layer, where a melt of the thermoplastic polymer is injected and the pressure during the application of the thermoplastic polymer is less than 60 bar;
wherein the thermoplastic polymer foam is a particle foam;
wherein the injection process is an injection-molding process, a transfer-molding process, or an injection-compression-molding process;
wherein the injection-molding process is carried out with a pressure of less than 60 bar, with a holding pressure of less than 50 bar, and with an injection speed of less than 100 mm/s.

2. The process according to claim 1, wherein the polymer foam comprises an expanded thermoplastic polyurethane (ETPU) or a biodegradable, aliphatic-aromatic copolyester.

3. The process according to claim 1 wherein the thermoplastic polymer applied in step (b) is selected from the group consisting of polyamide, thermoplastic polyurethane, acrylonitrile-butadiene-styrene, styrene-acrylonitrile, acrylate-styrene-acrylonitrile, acrylate-styrene-acrylonitrile/polycarbonate blend, polycarbonate, acrylonitrile-butadiene-styrene/polycarbonate blend, acrylonitrile-butadiene-styrene/polyamide blend, styrene-butadiene copolymer, polymethyl methacrylate, and combinations thereof.

4. The process according to claim 1, wherein the surface of the molding made of polymer foam is pretreated.

5. The process according to claim 4, wherein the pretreatment of the surface of the molding made of polymer foam comprises a corona treatment or plasma treatment.

6. The process according to claim 1, wherein the molding made of polymer foam has been manufactured from a polymer foam with a proportion of interstices in the range from 10 to 50%.

7. The process according to claim 1, wherein the melt temperature of the thermoplastic polymer applied in step (b) is in the range from 180 to 260° C.

8. The process according to claim 1, wherein the temperature of the mold is controlled to a temperature in the range from 10 to 60° C.

9. The process according to claim 1, wherein the thickness of the functional layer is in the range from 0.2 to 10 mm.

10. The process according to claim 1, wherein functional elements have been molded onto the functional layer.

11. A process for the production of a composite component, said composite component comprising (a) a molding consisting of a thermoplastic polymer foam and (b) a functional layer made of an unfoamed thermoplastic, the process comprising:
(a) inserting the molding consisting of thermoplastic polymer foam into a mold, wherein the thermoplastic polymer foam is composed of expanded thermoplastic polyurethane or biodegradable, aliphatic-aromatic copolyester,
(b) subsequently applying a thermoplastic polymer by an injection process to form the functional layer, where a melt of the thermoplastic polymer is injected and the pressure during the application of the thermoplastic polymer is less than 60 bar;
wherein the thermoplastic polymer foam is a particle foam,
wherein the inserting is carried out by inserting the molding made of thermoplastic polymer foam into a first half of the mold;
wherein a second half of the mold is subsequently used to seal the first half of the mold; and
wherein the applying is carried out by injection molding with a sprue cross-section in the range from 0.5 to 10 mm.

12. The process according to claim 11, wherein the thermoplastic polymer foam is an aliphatic-aromatic copolyester.

13. The process according to claim 11, wherein the thermoplastic polymer applied in step (b) is selected from the group consisting of polyamide (PA), acrylonitrile-butadiene-styrene (ABS), styrene-acrylonitrile (SAN), acrylatestyrene-acrylonitrile (ASA), acrylate-styrene-acrylonitrile/polycarbonate blend (ASA/PC), polycarbonate (PC), acrylonitrile-butadiene-styrene/polycarbonate blend (ABS/PC), acrylonitrile-butadiene-styrene/polyamide blend (ABS/PA), styrene-butadiene copolymer (SB), and polymethyl methacrylate (PMMA).

* * * * *